US012783622B2

(12) United States Patent
Beaver et al.

(10) Patent No.: US 12,783,622 B2
(45) Date of Patent: Nov. 3, 2026

(54) VIRTUAL AGENT TRANSPARENT USER AUTHENTICATION

(71) Applicant: Verint Americas Inc., Alpharetta, GA (US)

(72) Inventors: Ian Beaver, Spokane, WA (US); Vladislav Luzin, Pardes Hanna Karkur (IL)

(73) Assignee: Verint Americas Inc., Alpharetta, GA (US)

( * ) Notice: Subject to any disclaimer, the term of this patent is extended or adjusted under 35 U.S.C. 154(b) by 437 days.

(21) Appl. No.: 18/152,671

(22) Filed: Jan. 10, 2023

(65) Prior Publication Data

US 2024/0232308 A1 Jul. 11, 2024

(51) Int. Cl.

| | |
|---|---|
| ***G06F 21/32*** | (2013.01) |
| ***G10L 17/04*** | (2013.01) |
| ***G10L 17/06*** | (2013.01) |
| ***G10L 17/22*** | (2013.01) |

(52) U.S. Cl.

CPC .............. *G06F 21/32* (2013.01); *G10L 17/04* (2013.01); *G10L 17/06* (2013.01); *G10L 17/22* (2013.01)

(58) Field of Classification Search

CPC ......... G06F 21/32; G10L 17/04; G10L 17/06; G10L 17/22

See application file for complete search history.

(56) References Cited

U.S. PATENT DOCUMENTS

| | | | | |
|---|---|---|---|---|
| 9,491,167 B2 * | 11/2016 | Talhami | ................. | G06N 20/00 |
| 10,356,243 B2 * | 7/2019 | Sanghavi | ................ | H04L 51/02 |
| 11,196,863 B2 * | 12/2021 | Spohrer | ................. | G06N 3/006 |
| 11,482,231 B2 * | 10/2022 | Shetty | ...................... | G10L 17/24 |
| 11,570,165 B2 * | 1/2023 | Xuan | .................. | H04L 63/0853 |
| 12,021,857 B2 * | 6/2024 | Mavani | ................... | G06F 21/32 |
| 2018/0007060 A1 * | 1/2018 | Leblang | ................ | H04L 63/107 |
| 2018/0332016 A1 * | 11/2018 | Pandey | .............. | H04L 63/0428 |

* cited by examiner

*Primary Examiner* — Lynn D Feild
*Assistant Examiner* — Kelah Janae Mcfarland-Barnes
(74) *Attorney, Agent, or Firm* — Dinsmore & Shohl LLP

(57) ABSTRACT

Certain aspects of the present disclosure provide techniques for receiving audio data comprising a user voice command; determining a task to be completed by a remote service based on the user voice command; determining that a reference voice print associated with the user is stored in a user account; authenticating the user by determining that a sample voice print based on the user voice command matches the reference voice print associated with the user; storing authentication evidence associated with the task; and providing proof of user authentication to the remote service in order to initiate the task with the remote service.

19 Claims, 6 Drawing Sheets

VIRTUAL AGENT TRANSPARENT USER AUTHENTICATION

INTRODUCTION

Aspects of the present disclosure relate to transparently authenticating a user of a virtual assistant.

A virtual assistant, sometimes also referred to as an intelligent virtual assistant (IVA), is a software agent that assists users by performing tasks or services based on questions or commands provided by a user. Users often interact with virtual assistants on a user device through natural language, spoken or written words. For example, users may ask a virtual assistant to retrieve information or complete a transaction. A virtual assistant may interpret the user's request and determine a particular task for the virtual assistant to perform. A virtual assistant may then perform the task on behalf of the user. Virtual assistants improve users' lives by automating and performing tasks on behalf of the user. Increasingly, virtual assistants are being used by consumers and businesses alike.

In some instances, a user may request a virtual assistant to perform a task requiring the virtual assistant to interact with a third-party, such as a remote service. Ideally, the virtual assistant would connect to and perform a task with a third-party without requiring any further action from the user. However, many third-party services have security measures that prevent performing certain tasks without first authenticating the requesting party. This presents a technical problem in which the third-party service cannot directly verify the identity of the user for which the virtual assistant is acting and thus cannot complete the requested task without user intervention. Even when a virtual assistant is associated with a user account or specific user device, a third-party service cannot be certain an authentic user is directing the virtual assistant. Conventionally, the third-party will require the actual user to authenticate directly with the third-party, which defeats the purpose and convenience of using the virtual assistant. Practically, this means that virtual assistants are often unable to perform tasks without user intervention, which reduces their utility.

Accordingly, there is a need for improved methods for authenticating users of virtual assistants.

SUMMARY

Certain embodiments provide a method comprising: receiving audio data comprising a user voice command; determining a task to be completed by a remote service based on the user voice command; determining that a reference voice print associated with the user is stored in a user account; authenticating the user by determining that a sample voice print based on the user voice command matches the reference voice print associated with the user; storing authentication evidence associated with the task; and providing proof of user authentication to the remote service in order to initiate the task with the remote service.

Certain other embodiments provide a method comprising: receiving audio data comprising a user voice command; determining a task to be completed by a remote service based on the user voice command; determining that a sample voice print based on the user voice command cannot authenticate the user; authenticating the user based on a non-voice authentication method; storing the audio data as a user authentication model training sample; storing authentication evidence associated with the task; and providing proof of user authentication to the remote service in order to initiate the task with the remote service.

Other embodiments provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the related drawings set forth in detail certain illustrative features of one or more embodiments.

DESCRIPTION OF THE DRAWINGS

The appended figures depict certain aspects of one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for transparently authenticating users of a virtual assistant application to establish trust for a virtual assistant to perform tasks on behalf of the user.

Virtual assistants, such as Intelligent Virtual Assistants (IVAs), may perform many different tasks on behalf of users by contacting and exchanging information with third-party services. For example, a user may request a virtual assistant to make a dinner reservation, book a hotel room, or update account information through a natural language request uttered to the virtual assistant.

However, third-party services often bear the risk of fraudulent activity through their service and thus generally require a means of verifying that a virtual assistant is acting on behalf of an authentic user. By way of example, a third-party service may not authorize a transaction requested by a virtual assistant until the end user directing the virtual assistant is authenticated by the third-party. Consequently, a user often needs to interact directly with the third-party service to complete a request made through the virtual assistant, which greatly reduces the benefit of the virtual assistant. Moreover, this inconvenience may cause the user to avoid one or both of the virtual assistant and the third-party service.

Thus, there exists a technical problem of how a third-party can authenticate a user without directly interacting with the user in order to perform tasks initiated by a virtual assistant on behalf of the user. In other words, how can the third-party establish a trust relationship with the virtual assistant so that it may act autonomously on behalf of the user? Moreover, because a virtual assistant may be capable of requesting and performing a large variety of tasks, the third-party may further need to determine the extent to which the virtual assistant is allowed to act on behalf of the user (e.g., to perform certain tasks on behalf of the user, but not others), even if a trust relationship exists. For example, the third-party may be authorized to provide account information, such as a balance of a bank account, but not to change account information, such as changing contact details associated with the account.

Aspects described herein provide technical solutions to the aforementioned technical problems. As described in more detail below, a user may be transparently authenticated when using a device that interacts with a third-party service based on a voice print of the user. Beneficially, the voice print may be established and then used for verification without user interaction. This technical solution enables a virtual assistant to authenticate a user when interacting with third-party services so that a user need not intervene to complete a wide variety of tasks, thus alleviating the technical problems in conventional systems.

Figure 1:
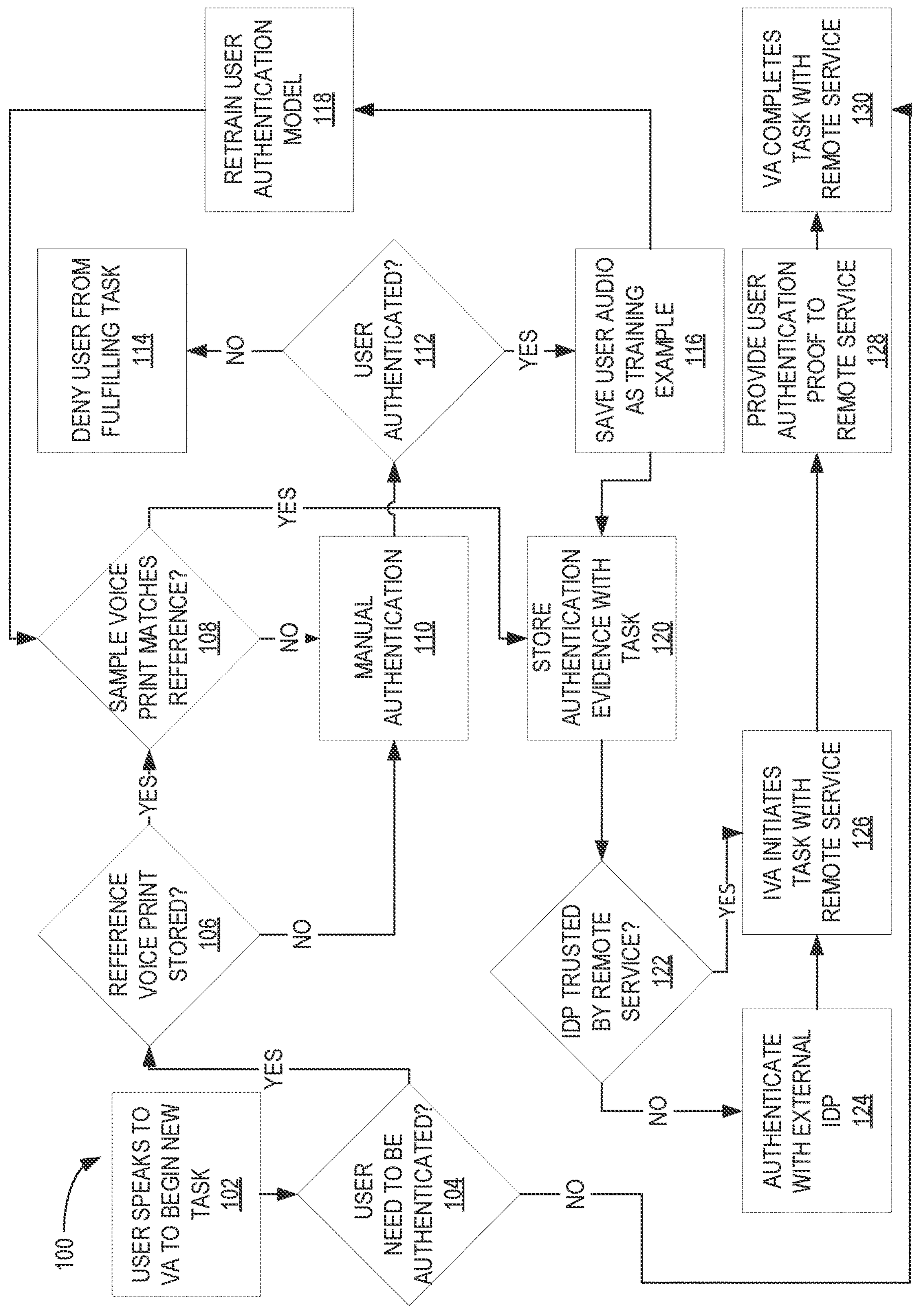
FIG. 1 depicts an example flowchart of a method for a virtual assistant completing a task on behalf of an authenticated user.

Example Process Flow for Transparently Authenticating a User of a Virtual Assistant FIG. 1 depicts an example process flow 100 for transparently authenticating a user of a virtual assistant. Generally, aspects of process flow 100 may be performed by virtual assistant trust system 200, as described below with respect to FIG. 2.

Figure 2:
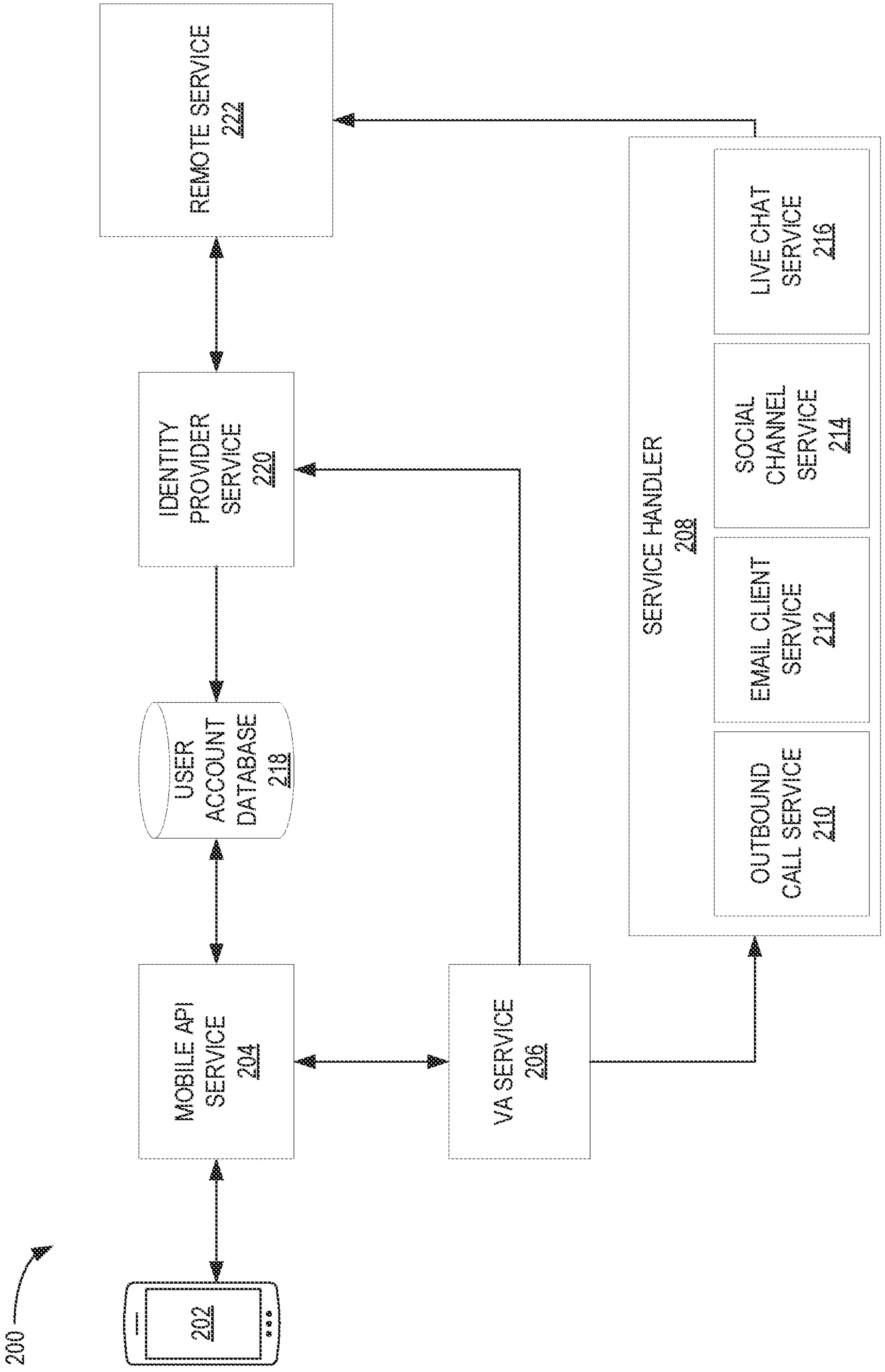
FIG. 2 depicts an example system for establishing the trust of a virtual assistant.

Flow 100 begins at step 102 with a user speaking to a user device (e.g., user device 202, as described with respect to FIG. 2), instructing a virtual assistant to begin a new task on behalf of the user with a remote service (e.g., remote service 222 in FIG. 2). Generally speaking, when a user requests a virtual assistant to perform a task on its behalf, that may be referred to as a user voice command. Note that a remote service in this example is an example of a third-party service, which is to say a service hosted separately from the user's device and the virtual assistant in this example.

In some embodiments, a virtual assistant may use Natural Language Processing (NLP) techniques to interpret the user's spoken instructions and determine a task to be performed. For example, a user may instruct, "Update my billing information with my utility provider," and the virtual assistant determines the task to perform is updating the user's billing information with the utility provider. An audio device or peripheral, such as a microphone, may be incorporated into a user device for receiving the user's spoken instructions and generating audio data to be used by the system. Note that while audio data is used in various examples described herein, other forms of data may be generated to assist a virtual assistant in performing tasks. For example, a device may receive commands by detecting signs using image data or by receiving textual instructions via a user interface and/or input device.

Flow 100 then proceeds to step 104 with determining whether the user needs to be authenticated to perform the task. In some embodiments, a user is authenticated every time the user initiates a new task with the virtual assistant. For example, a user may be authenticated when the user launches a virtual assistant and remains authenticated for a single session with the virtual assistant, which beneficially protects confidential information associated with the virtual assistant, such as the virtual assistant task history or status. In some embodiments, a user is authenticated when a task requires a user to be authenticated, for example, when the task requires a user to be logged into a user account for tasks such as manipulating a user's calendar, sending text messages, executing purchases, etc. For example, if a user is using a virtual assistant on a smart speaker device, the smart speaker device may always be on and authenticate the user when the task requires the user to be authenticated. If the user does not need to be authenticated, then the virtual assistant proceeds to step 130 with completing the task with the remote service, as discussed in further detail below.

Flow 100 then proceeds to step 106 with determining whether a reference voice print is stored for the user, such as in user account database 218 in FIG. 2, discussed below. A voice print, for example, may be a voice signature, voice model, and the like, associated with a user's voice. A voice print, in some embodiments, may be data representing the unique vocal characteristics of an individual's voice, such as accent, cadence, tone, rate of speed, spectral characteristics, etc. A reference voice print may be obtained, for example, from a user authentication model, such as described in further detail with respect to step 118 below.

If there is a reference voice print stored for the user, then flow 100 proceeds to step 108 with determining whether a sample voice print matches the reference voice print. A sample voice print, in some embodiments, comprises audio data of a user voice command, such as audio data of the user speaking to the user device instructing the virtual assistant to begin the task.

In some embodiments, a match between a sample voice print and the reference voice print may be determined by a voice print matching component of a user authentication model. In some embodiments, the user authentication model determines an acoustic signature associated with a user voice print, such as a sample voice print or a reference voice print. The acoustic signature associated with a user voice print may be a signal representation of user phoneme production and inflections that define an accent or style of speech. In some embodiments, the user voice print matching component compares the acoustic signature associated with the sample voice print and the acoustic signature associated with the reference voice print and determines a score representing the probability that the sample voice print and the reference voice print belong to the same person based on the level of overlap between the acoustic signatures. For example, if there is significant overlap between the acoustic signature associated with the sample voice print and the acoustic signature associated with the reference voice print, then the score indicates a high probability the sample voice print and the reference voice print belong to the same person. Thus, the sample voice print and the reference voice print are determined to match and the user is authenticated. In some embodiments, the probability that the sample voice print and the reference voice print belong to the same person may be determined through various modeling techniques, for example, hidden Markov models, neural network models, mismatch compensation, score-to-likelihood-ratio conversion, and the like. In some embodiments, a user authentication model may be trained based on historical user audio, such as user audio saved as a training example at step 116, discussed below, to determine a reference acoustic signature and determine a match between a sample voice print and a reference voice print. In some embodiments, a sample voice print may be determined to match a reference voice print through other voice comparison methods to authenticate a user. If the sample voice print matches the reference voice print, then the user is authenticated and flow 100 proceeds to step 120.

If at step 106, there is not a reference voice print stored for the user, or at step 108, the sample voice print does not match the reference voice print, then the user must be manually authenticated at step 110. A user may be manually authenticated, for example, through password-based authentication, multi-factor authentication, certificate-based authentication, biometric authentication, token-based authentication, and others.

If the user is determined to be unauthenticated at step 112, then the virtual assistant is denied from fulfilling the task at 114 and the task is terminated. For example, where the user is not authenticated, the virtual assistant may not perform the task on behalf of the user. In some cases, the failed authentication may be stored and/or reported, such as to ensure compliance and security of the identity provider service (e.g., identity provider service 220 in FIG. 2). Audio data associated with a failed authentication may also be stored and/or reported.

If the user is determined to be authenticated at step 112, then the audio data associated with the task instruction (received at step 102) is saved a training example for a user authentication model.

Flow 100 then proceeds to step 118 with training (or retraining/tuning) the user authentication model. For example, where there was no reference voice print stored, such as at step 106, a reference voice print may be generated through an authentication model for the user. The new reference voice print may then be available for subsequent user authentication. In another example, where the sample voice print failed to match the reference voice print, an authentication model for the user may be retrained or tuned and a reference voice print updated. The updated reference voice print may then be available for subsequent user authentication.

If the user is authenticated at step 108 or 112, flow 100 proceeds to step 120 with storing authentication evidence associated with the specific task. In some embodiments, evidence of the user authentication may be stored, for example, with an identity provider service, such as identity provider service 220 discussed with respect to FIG. 2, below. In some embodiments, the authentication evidence comprises one or more of: a task-specific authentication token, a time-stamp associated with the audio data, an IP address associated with the user, a user-ID and password, or other authentication evidence showing the user has permission to access the task. A task-specific authentication token may be, for example, an authentication token identifies a user as authenticated for a particular task to be performed by the virtual assistant. A time-stamp associated with the audio data may be, for example, a time-stamp indicating when the audio data was generated. An IP address associated with the user may be, for example, an IP address associated with the user device, such as user device 202 in FIG. 2. Evidence of user authentication may be used, for example, to audit actions taken by a virtual assistant.

Flow 100 then proceeds to step 122 with determining whether the identity provider service (IdP) is trusted by the remote service. For example, the identity provider service may be trusted by the remote service when the identity provider service and the remote service use identity federation. In identity federation, a service provider relies on an identity provider to authenticate users and convey identity information to authorize user access to the service provider.

If the identity provider service is trusted by the remote service, flow 100 proceeds directly to step 126, which is discussed below.

If the identity provider service is not trusted by the remote service, then flow 100 proceeds to step 124 with authenticating with an external identity provider service. In some cases, the remote service may not trust one identity provider service, such as an internal identity provider service, but the remote service does trust an external identity provider service. In such cases, the internal identity provider service may authenticate the user with the external identity provider service and obtain proof of user authentication from the external identity provider service. Once the user has been authenticated with the external identity provider service, flow 100 continues to step 126.

At step 126, the virtual assistant initiates the task with the remote service. In some embodiments, the virtual assistant may initiate the task through a service handler to contact the remote service, such as described in more detail below with respect to FIG. 2.

Flow 100 then proceeds at step 128 with providing the proof of user authentication to the remote service. In some embodiments, the proof of user authentication comprises an indication that the virtual assistant is authorized to perform the task on behalf of the user. Further, the proof of user authentication may indicate specific tasks the virtual assistant can perform for the user, or in other words, the scope for which the virtual assistant has permission from the user to act.

In some embodiments, the proof of user authentication comprises a token, such as an authentication token, a connected token, a contactless token, a disconnected token, a software token, a web token, and the like. In some embodiments, the token may be signed and expire after a set time period, which beneficially reduces the chance of an initially authorized but later compromised virtual assistant performing an unauthorized task.

Flow 100 then proceeds at step 130 with completing the task with the remote service.

Note that flow 100 is just one example, and other flows having additional, fewer, alternative, or differently ordered steps may be implemented.

Example System for Establishing Trust with a Virtual Assistant

FIG. 2 depicts an example system 200 for establishing trust with a virtual assistant.

Generally, a user wishing to have a virtual assistant perform some task with a remote service 222 on their behalf may interact with user device 202 (e.g., utter or enter a user voice command into user device 202). In response, user device 202 connects with a virtual assistant service 206. In the depicted embodiment, virtual assistant service 206 is communicatively coupled with user device 202 through mobile API service 204. Thus, in the depicted embodiment, mobile API service 204 routes all communication and data between user device 202 and virtual assistant service 206.

Note that while user device 202 is depicted throughout as a mobile smart device, in this case a smart phone, any electronic device with the capability to interact with a user (e.g., to receive a user command or query) and connect with virtual assistant service 206 might similarly implement the methods described herein. For example, user device 202 could be a tablet computer, desktop computer, a smart home device (e.g., a smart speaker), a smart wearable device, or generally any computer processing device with the ability to receive data from a user (e.g., through a user interface) and connect to virtual assistant service 206.

Mobile API service 204 is configured to receive audio data, such as audio data associated with task instruction by a user speaking to a virtual assistant, as described with respect to step 102 in FIG. 1. Mobile API service 204 is further configured to save the audio data as a sample voice print associated with the specific task the virtual assistant is to perform with user account database 218.

Virtual assistant service 206 is configured to determine an appropriate channel to contact remote service 222. Virtual assistant service 206 may use various communication channels, including, for example, phone calls, emails, social media communications, text messages, live chats, and other communication channels.

In some embodiments, virtual assistant service 206 determines a communication channel to contact remote service 222 based on a characteristic of a task, for example, the type or complexity of a task. In some embodiments, virtual assistant service 206 determines a communication channel to contact remote service 222 based on which communication channels the virtual assistant has been trained on. For example, virtual assistant service 206 may be trained to book a flight over a conversational communication channel such as a phone call, text message, or live chat, but not through social media or email. In some embodiments, virtual assistant service 206 determines a communication channel to contact a remote service 222 based on a characteristic of the remote service 222, such as the type of the remote service, availability of various communication channels for the remote service, or preferred communication channels of the remote service. In some embodiments, virtual assistant service 206 determines a communication channel to contact a remote service 222 based on current expected wait times across various communication channels. In some embodiments, virtual assistant service 206 determines a communication channel to contact a remote service 222 based on a cost to remote service 222 associated with a communication channel. For example, virtual assistant service 206 contacting remote service 222 via a phone call may be higher cost than a live chat for remote service 222 and virtual assistant service 206 may user the lower cost live chat.

Virtual assistant service 206 is further configured to register a communication session with identity provider service 220. In some embodiments, registering a communication session includes indicating the selected communication channel (e.g., phone call, email, social media communication, text message, or live chat) through which virtual assistant service 206 will contact the remote service 222 to perform a task on behalf of the user. Generally, virtual assistant service 206 then uses an appropriate service handler 208 to contact the remote service 222 on the selected communication channel, as described with respect to step 126 in FIG. 1.

For example, virtual assistant service 206 may use outbound call service 210 to contact remote service 222 by way of a phone call or text message, email client service 212 to contact remote service 222 by way of an email, social channel service 214 to contact remote service 222 by way of a social media communication (e.g., a direct message, a post, etc.), live chat service 216 to contact remote service 222 by way of chat messages, and the like.

Identity provider service 220 is configured to authenticate the user. Identity provider service 220 is further configured to access a reference voice print associated with the user, such as described with respect to step 106 in FIG. 1, which may be stored in user account database 218. If a reference voice print is stored for the user, then identity provider service 220 determines whether the sample voice print matches the reference voice print, described with respect to step 108 in FIG. 1. If the reference voice print and the sample voice print match, then identity provider service 220 stores authentication evidence, as described with respect to step 120 in FIG. 1.

Identity provider service 220 is configured to manually authenticate a user if no reference voice print is stored in user account database 218, or if identity provider service 220 determines the reference voice print does not match the sample voice print, as described with respect to step 110 in FIG. 1. Identity provider service 220 may terminate a task and deny virtual assistant service 206 from fulfilling the task, if the user cannot be authenticated.

Identity provider service 220 is further configured to train (or retain/tune) a reference authentication model to obtain a reference voice print or update a reference voice print if the user is successfully authenticated, as described with respect to step 118 in FIG. 1. Identity provider service 220 may store the reference voice print in user account database 218. Further, authentication evidence may be stored identity provider service 220, as described with respect to step 120 in FIG. 1.

Identity provider service 220 is configured to determine whether the remote service 222 trusts identity provider service 220, as described with respect to step 122 in FIG. 1. If identity provider service 220 is trusted, then identity provider service 220 obtains the proof of user authentication stored in user account database 218. If identity provider service 220 is not trusted by the remote service, then identity provider service authenticates with an external identity provider service and obtain proof of user authentication from the external provider service, as described with respect to step 124.

Identity provider service 220 is further configured to receive a communication session authentication query from the remote service 222, where the query is used to determine whether virtual assistant service 206 is associated with an authenticated user. Remote service 222 provides contact information for the selected communication channel (e.g., an origin telephone number, email account, social media account, chat identity, or the like) associated with the communication session as part of the communication session authentication query. Identity provider service 220 determines whether the communication session was registered with identity provider service 220 based on the provided contact information for the selected communication channel.

If identity provider service 220 determines that no communication session was registered with identity provider service 220 based on the provided contact information for the selected communication channel, then identity provider service 220 sends an indication to remote service 222 that the communication session is not expected.

If identity provider service 220 determines that a communication session was registered with identity provider service 220 based on the provided contact information for the selected communication channel, then identity provider service 220 sends an indication to remote service 222 that the communication session is expected.

Identity provider service 220 is further configured to determine that the user associated with the registered communication session has been authenticated. In some cases, identity provider service 220 obtains a proof of user authentication stored in user account database 218. Identity provider service 220 can then send the proof of user authentication to remote service 222 to prove that the user that initiated the registered communication session is authentic, as described with respect to step 128.

Once proof of user authentication is sent to remote service 222, trust is established between virtual assistant service 206 and remote service 222, allowing virtual assistant service 206 to perform the task on behalf of the user, such as at step 130 in FIG. 1. For example, the task may include completing a transaction, retrieving account information, updating account information, enabling or disabling an account service, querying the status of a shipment or transaction, scheduling a service or action, and the like.

In some cases, virtual assistant service 206 may commence, but not complete a task on behalf of the user. For example, where the task is to call a utility provider to inquire about a recent bill, virtual assistant service 206 may establish a trust relationship with the utility provider customer service department (e.g., remote service 222), and transfer the call to the user when a customer service department agent has been reached. In this example, virtual assistant service 206 initiates contact with the customer service department, authenticates the user with the customer service department, and transfers the call between departments all without user interaction and without the user waiting on hold. Beneficially, this reduces the time the user is on the call and the user may proceed to directly inquiring about their recent bill.

Figure 3:
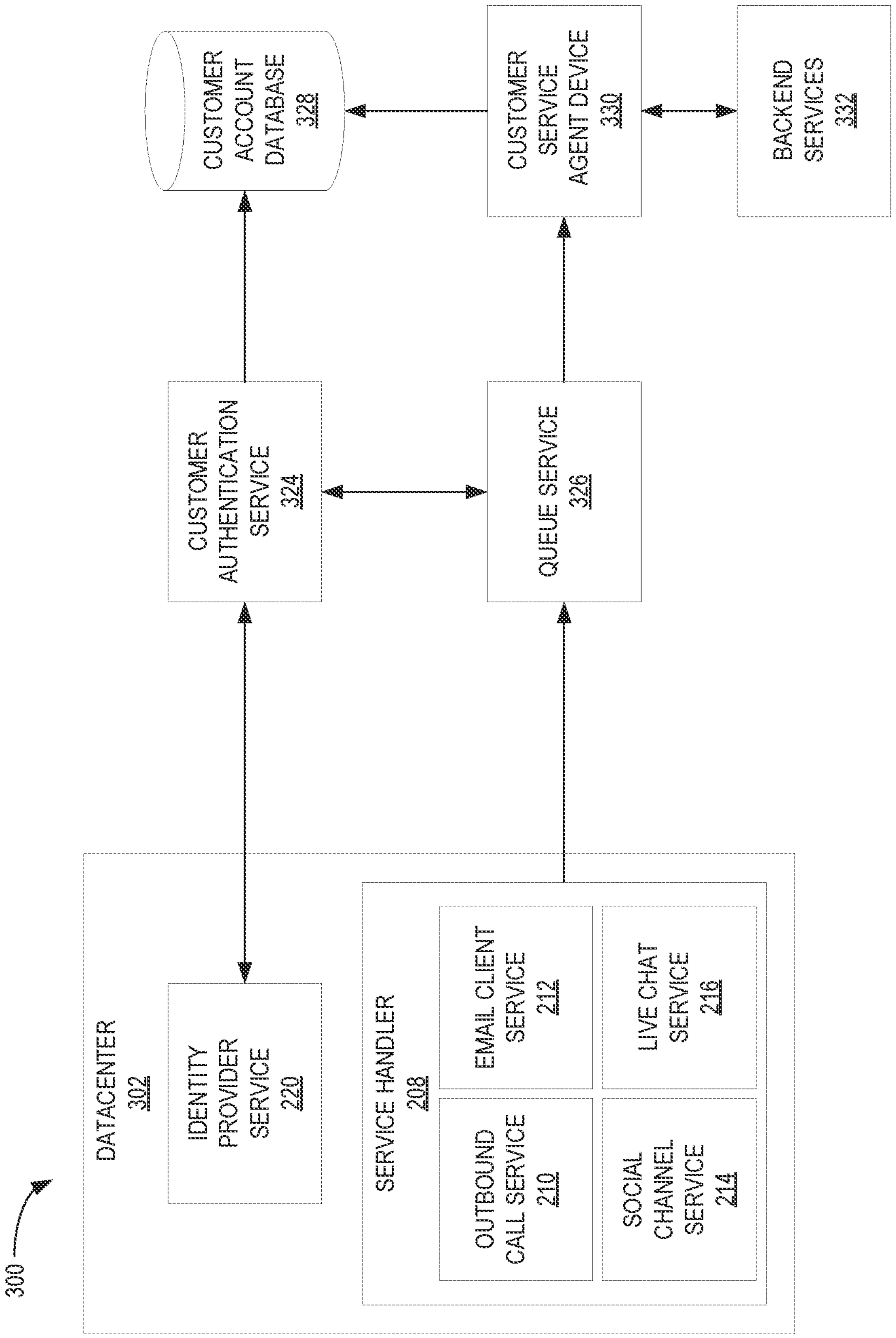
FIG. 3 depicts another example system for establishing the trust of a virtual assistant.

FIG. 3 depicts further aspects of a remote service for establishing trust with a virtual agent through an example data flow 300 for establishing trust of a virtual assistant.

Generally, all like numbered aspects of FIG. 3 are as described in FIG. 2. In the depicted example, remote service 222 comprises queue service 326, customer authentication service 324, customer account database 328, customer service agent device 330, and backend services 332. In the depicted example, datacenter 302 comprises identity provider service 220 and service handler 208.

Queue service 326 is generally configured to receive a communication session from service handler 208 on a communication channel, such as a call, email, social media communication, text message, or live chat from a virtual assistant.

Queue service 326 is further configured to query customer authentication service 324 to determine whether the user is authenticated before sending the communication session to a customer service agent using a customer service agent device 330. In some embodiments, to determine whether a user is authenticated, customer authentication service 324 queries identity provider service 220. A communication session authentication query sent by customer authentication service 324, asks identity service provider whether the communication session was registered with identity provider service 220. Customer authentication service 324 provides contact information for the selected communication channel (e.g., an origin telephone number, email account, social media account, or chat identity) associated with the communication session with the communication session authentication query. Identity provider service 220 then determines whether the communication session was registered with identity provider service 220 based on the provided contact information for the selected communication channel.

If the communication session was not registered with identity provider service 220, then customer authentication service 324 receives, from identity provider service 220, an indication that the communication session is unexpected and the user is unauthenticated. Customer authentication service 324 then indicates to queue service 326 the user is unauthenticated. Queue service 326 may then transfer the communication session to a customer service agent device 330 as unauthenticated. In some embodiments, a customer service agent using customer service agent device 330 may then directly authenticate the user.

If the contact information is associated with a registered communication session, then customer authentication service 324 receives proof of user authentication from identity provider service. Customer authentication service 324 may then trust the user was authenticated by identity provider service 220, without needed to authenticate the user directly. This reduces the number of times a user needs to be authenticated while maintaining security. If identity provider service 220 is trusted, then the received proof of user authentication is associated with identity provider service 220. If identity provider service 220 is not trusted by the remote service, then the proof of user authentication is associated with an external identity provider service, as described with respect to step 124 in FIG. 1.

In some embodiments, the proof of user authentication authorizes the performance of a task on behalf of the user. For example, the proof of user authentication may authorize access to a customer account or authorize a transaction with that account.

In some embodiments, the proof of user authentication comprises an indication that a virtual assistant (e.g., virtual assistant service 206 in FIG. 2), is authorized to perform a specific task on behalf of the user. For example, the proof of user authentication may indicate the virtual assistant is authorized to make a particular payment to a particular recipient on a customer account. Customer authentication service 324 may use the proof of user authentication to look up a user in a customer account database 328 to find customer account information. Customer account information and the proof of user authentication are then sent to a customer service agent device 330 and backend services 332, to establish trust for the communication session. In some embodiments, a customer service agent may use customer account information and the proof of user authentication during a trusted communication session to perform an authorized task.

Figure 4:
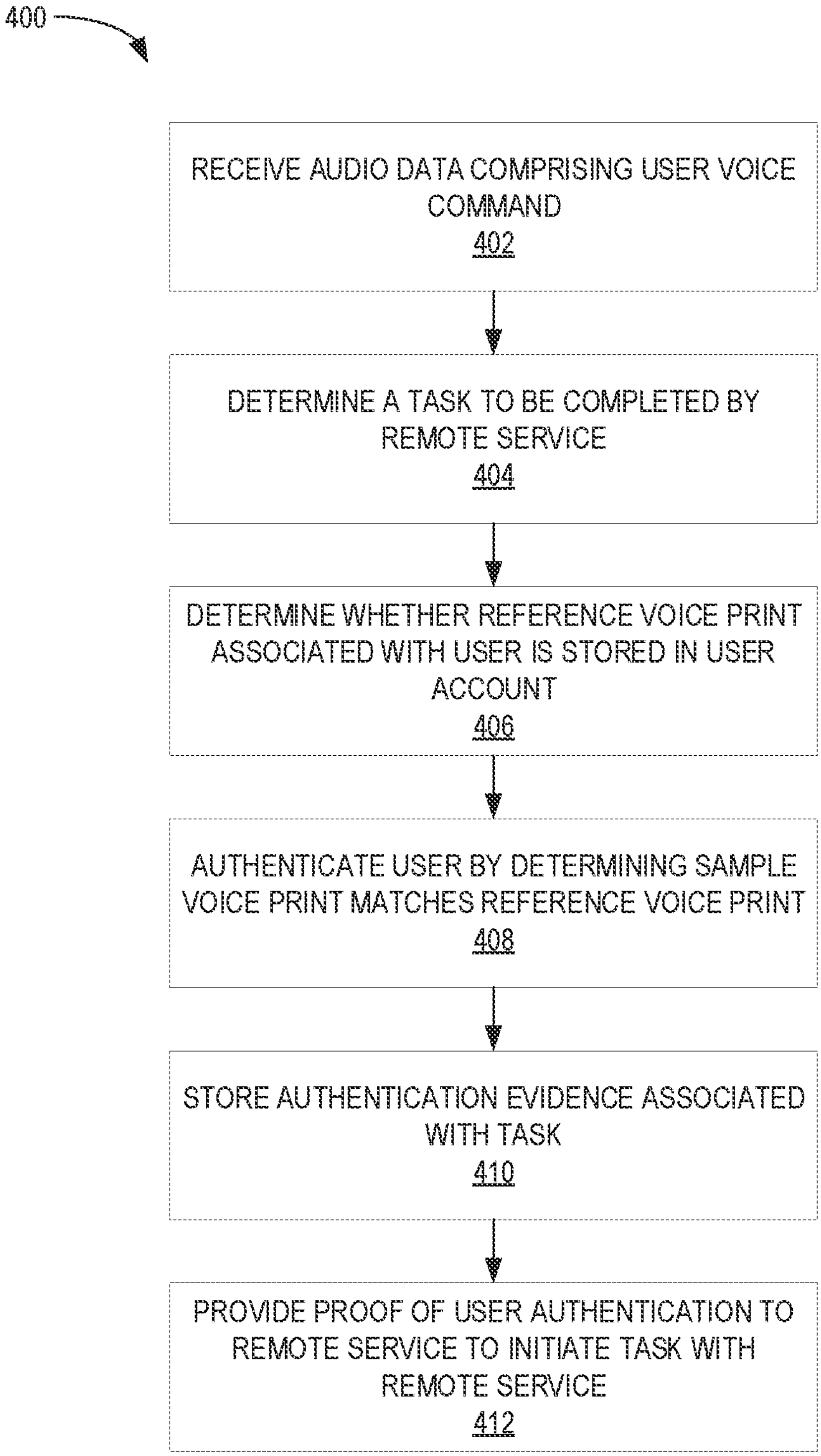
FIG. 4 depicts an example method for providing proof of user authentication by a virtual assistant.

Example Method for Providing Proof of User Authentication by a Virtual Assistant FIG. 4 depicts an example method 400 for providing proof of user authentication by a virtual assistant.

Method 400 begins at step 402 with receiving audio data comprising a user voice command, such as when a user speaking to a virtual assistant as described above with respect to FIG. 1.

Method 400 then proceeds to step 404 with determining a task to be completed by a remote service based on the user voice command, such as through NLP techniques as described above with respect to FIG. 1.

In some embodiments, method 400 further comprises determining that the task requires proof of user authentication, such as described with respect to step 104 of FIG. 1.

Method 400 then proceeds to step 406 with determining that a reference voice print associated with the user is stored in a user account, such as in user account database 218 in FIG. 2.

Method 400 then proceeds to step 408 with authenticating the user by determining that a sample voice print based on the user voice command matches the reference voice print associated with the user, such as described above with respect to FIG. 1.

Method 400 then proceeds to step 410 with storing authentication evidence associated with the task. For example, authentication evidence may be stored in a user account, such as in user account database 218 in FIG. 2.

In some embodiments, the authentication evidence comprises one or more of: a task-specific authentication token; a time-stamp associated with the audio data; or an IP address associated with the user.

Method 400 proceeds to step 412 with providing proof of user authentication to the remote service in order to initiate the task with the remote service. For example, proof of user authentication may be provided to customer authentication service 324 in response to a query, as described above with respect to FIG. 3.

In some embodiments, method 400 further comprises determining that a trust relationship exists with the remote service, wherein the proof of user authentication comprises a task-specific authentication token stored with the authentication evidence.

In some embodiments, method 400 further comprises determining that a trust relationship does not exist with the remote service; authenticating with an external identification provider; and receiving from the external identification provider the proof of user authentication, such as described with respect to step 124 of FIG. 1.

In some embodiments, the proof of user authentication comprises a username and user password, such as associated with a customer account in customer account database 328 in FIG. 3.

Note that method 400 is one example, and other flows including additional, alternative, fewer steps, or steps in a different order, are possible consistent with various aspects described herein.

Figure 5:
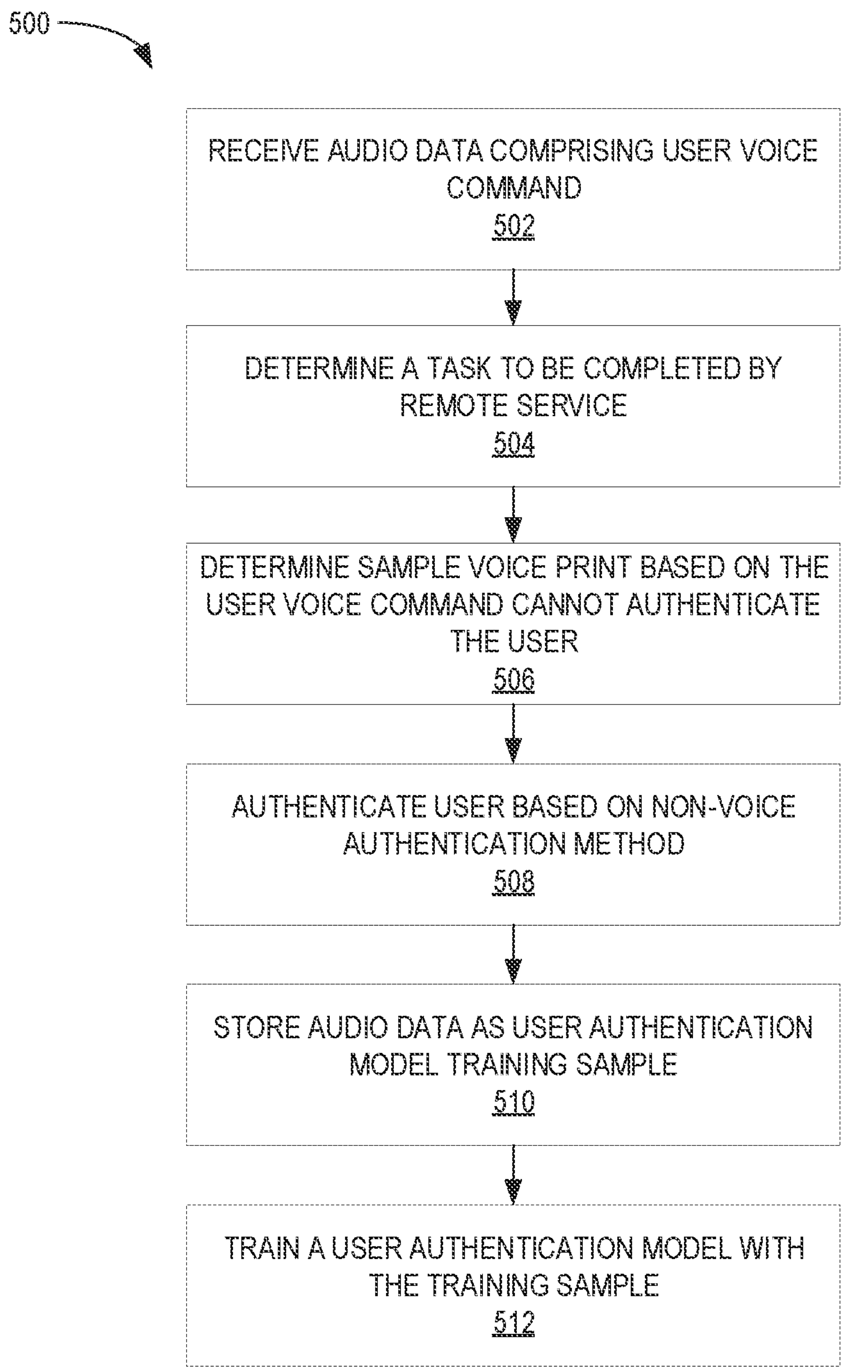
FIG. 5 depicts an example method for training a virtual assistant to authenticate a user based on voice.

Example Method for Training a Virtual Assistant to Authenticate a User Based on Voice FIG. 5 depicts an example method 500 for training a virtual assistant to authenticate a user based on a user's voice.

Method 500 begins at step 502 with receiving audio data comprising a user voice command, such as when a user speaks to a virtual assistant, as described above with respect to FIG. 1.

Method 500 then proceeds to step 504 with determining a task to be completed by a remote service based on the user voice command, such as through NLP techniques as described above with respect to FIG. 1.

In some embodiments, method 500 further comprises determining that the task requires proof of user authentication, such as described with respect to step 104 of FIG. 1.

Method 500 then proceeds to step 506 with determining that a sample voice print based on the user voice command cannot authenticate the user.

In some embodiments, determining that the sample voice print based on the user voice command cannot authenticate the user comprises determining that no reference voice print associated with the user is stored in a user account, such as described with respect to step 106 in FIG. 1.

In some embodiments, determining that the sample voice print based on the user voice command cannot authenticate the user comprises determining that a reference voice print associated with the user stored in a user account does not match the sample voice print, such as described with respect to step 108 in FIG. 1.

Method 500 then proceeds to step 508 with authenticating the user based on a non-voice authentication method, such as described with respect to step 110 in FIG. 1.

Method 500 then proceeds to step 510 with storing the audio data as a user authentication model training sample, such as described with respect to step 116 in FIG. 1.

Method 500 then proceeds to step 512 with training a user authentication model based on the user authentication model training sample, such as described with respect to step 118 in FIG. 1.

In some embodiments, method 500 further comprises storing the trained user authentication model in a user account. For example, the trained user authentication model may be stored in user account, such as in user account database 218 in FIG. 2.

In some embodiments, method 500 further comprises storing authentication evidence associated with the task; and providing proof of user authentication to the remote service in order to initiate the task with the remote service. For example, authentication evidence may be stored in user account, such as in user account database 218 in FIG. 2, and proof of user authentication may be provided to customer authentication service 324 in response to a query, as described above with respect to FIG. 3.

In some embodiments, the authentication evidence comprises one or more of: a task-specific authentication token; a time-stamp associated with the audio data; or an IP address associated with the user.

In some embodiments, method 500 further comprises determining that a trust relationship exists with the remote service, wherein the proof of user authentication comprises a task-specific authentication token stored with the authentication evidence.

In some embodiments, method 500 further comprises determining that a trust relationship does not exist with the remote service; authenticating with an external identification provider; and receiving from the external identification provider the proof of user authentication, such as described with respect to step 124 of FIG. 1.

In some embodiments, method 500 further comprises determining that the task requires proof of user authentication.

In some embodiments, the proof of user authentication comprises a username and user password.

Note that method 500 is one example, and other methods including additional, alternative, or fewer steps, or steps in a different order, are possible consistent with the various aspects described herein.

Example Processing System

Figure 6:
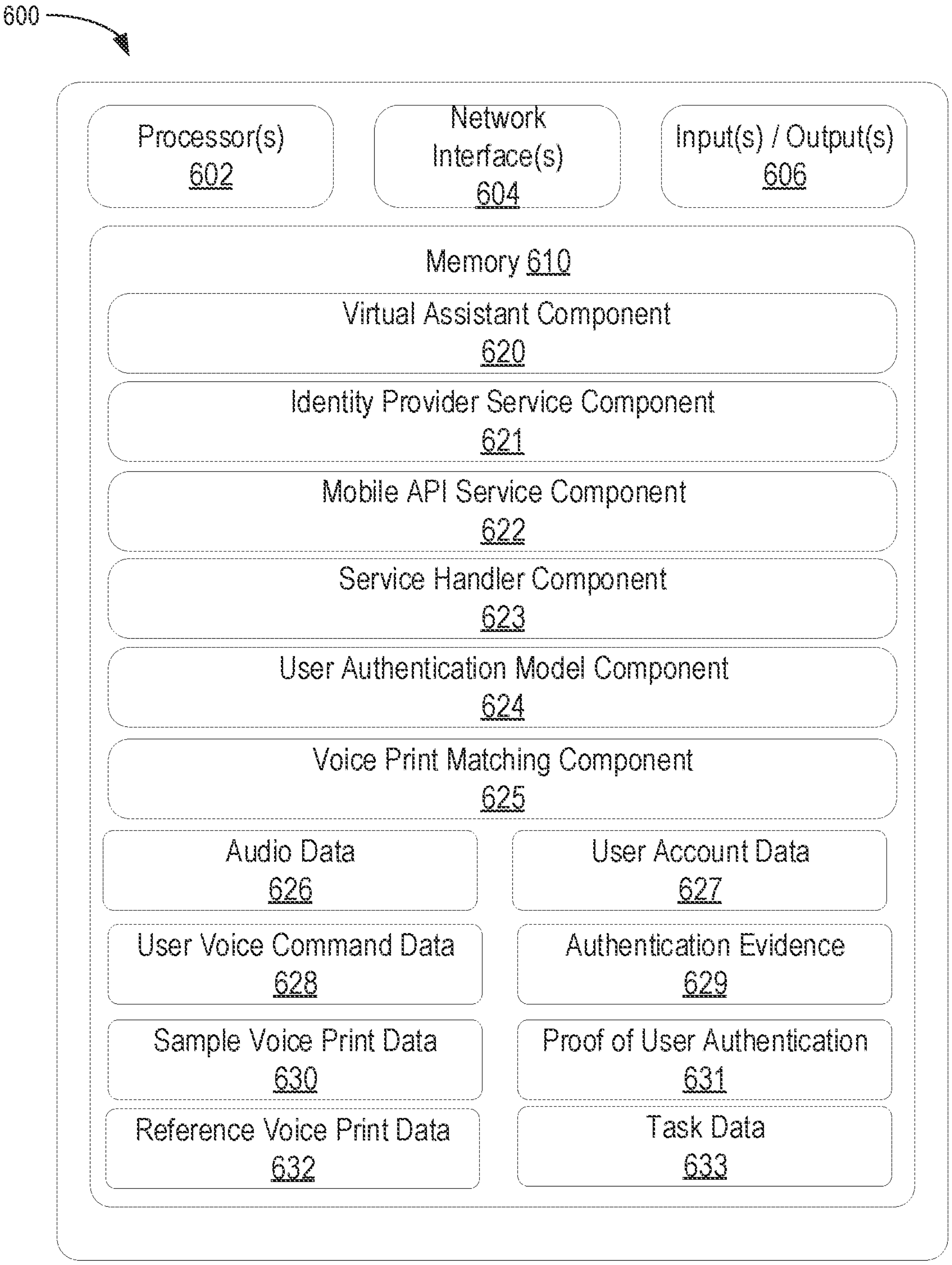
FIG. 6 depicts an example processing system configured to perform the methods described herein.

FIG. 6 depicts an example processing system 600 configured to perform the methods described herein.

Processing system 600 includes one or more processors 602. Generally, a processor 602 is configured to execute computer-executable instructions (e.g., software code) to perform various functions, as described herein.

Processing system 600 further includes network interface 604, which generally provides data access to any sort of data network, including local area networks (LANs), wide area networks (WANs), the Internet, and the like.

Processing system 600 further includes input(s) and output(s) 606, which generally provide means for providing data to and from processing system 600, such as via connection to computing device peripherals, including user interface peripherals.

Processing system 600 further includes a memory 610 comprising various components. In this example, memory 610 includes a virtual assistant component 620, an identity provider service component 621, a mobile API service component 622, a service handler component 623, a user authentication model component 624, a voice print matching component 625, audio data 626, user account data 627, user voice command data 628, authentication evidence 629, sample voice print data 630, proof of user authentication 631, reference voice print data 632, and task data 633.

Processing system 600 may be implemented in various ways. For example, processing system 600 may be implemented within on-site, remote, or cloud-based processing equipment. Note that in various implementations, certain aspects may be omitted, added, or substituted from processing system 600.

Example Clauses

Implementation examples are described in the following numbered clauses:

Clause 1: A method, comprising: receiving audio data comprising a user voice command; determining a task to be completed by a remote service based on the user voice command; determining that a reference voice print associated with the user is stored in a user account; authenticating the user by determining that a sample voice print based on the user voice command matches the reference voice print associated with the user; storing authentication evidence associated with the task; and providing proof of user authentication to the remote service in order to initiate the task with the remote service.

Clause 2: The method of Clause 1, further comprising: determining that a trust relationship exists with the remote service, wherein the proof of user authentication comprises a task-specific authentication token stored with the authentication evidence.

Clause 3: The method of Clause 1, further comprising: determining that a trust relationship does not exist with the remote service; authenticating with an external identity provider service; and receiving from the identity provider service the proof of user authentication.

Clause 4: The method of any one of Clause 1-3, further comprising determining that the task requires proof of user authentication.

Clause 5: The method of any one of Clause 1-4, wherein the proof of user authentication comprises a username and user password.

Clause 6: The method of any one of Clause 1-5, wherein the authentication evidence comprises one or more of: a task-specific authentication token; a time-stamp associated with the audio data; or an IP address associated with the user.

Clause 7: A method, comprising: receiving audio data comprising a user voice command; determining a task to be completed by a remote service based on the user voice command; determining that a sample voice print based on the user voice command cannot authenticate the user; authenticating the user based on a non-voice authentication method; storing the audio data as a user authentication model training sample; storing the audio data as a user authentication model training sample; and training a user authentication model based on the user authentication model training sample.

Clause 8: The method of Clause 7, further comprising storing authentication evidence associated with the task; and providing proof of user authentication to the remote service in order to initiate the task with the remote service.

Clause 9: The method of any one of Clause 7-8, further comprising storing the trained user authentication model in a user account.

Clause 10: The method of any one of Clause 7-9, wherein determining that the sample voice print based on the user voice command cannot authenticate the user comprises determining that no reference voice print associated with the user is stored in a user account.

Clause 11: The method of any one of Clause 7-9, wherein determining that the sample voice print based on the user voice command cannot authenticate the user comprises determining that a reference voice print associated with the user stored in a user account does not match the sample voice print.

Clause 12: The method of any one of Clause 7-11, further comprising: determining that a trust relationship exists with the remote service, wherein the proof of user authentication comprises a task-specific authentication token stored with the authentication evidence.

Clause 13: The method of any one of Clause 7-11, further comprising: determining that a trust relationship does not exist with the remote service; authenticating with an external identity provider service; and receiving from the identity provider service the proof of user authentication.

Clause 14: The method Clause any one of 7-13, further comprising determining that the task requires proof of user authentication.

Clause 15: The method of Clause any one of 7-14, wherein the proof of user authentication comprises a username and user password.

Clause 16: The method of Clause any one of 7-15, wherein the authentication evidence comprises one or more of: a task-specific authentication token; a time-stamp associated with the audio data; or an IP address associated with the user.

Clause 17: An apparatus, comprising: a memory comprising computer-executable instructions; a processor configured to execute the computer-executable instructions and cause the apparatus to perform a method in accordance with any one of Clauses 1-16.

Clause 18: An apparatus, comprising means for performing a method in accordance with any one of Clauses 1-16.

Clause 19: A non-transitory computer-readable medium comprising computer-executable instructions that, when executed by a processor of a processing system, cause the processing system to perform a method in accordance with any one of Clauses 1-16.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:

receiving audio data comprising a user voice command from a user, determining a task to be completed by a remote service based on the user voice command;

determining a communication channel to complete the task with the remote service;

registering a communication session associated with the task and the communication channel;

determining the task requires proof of user authentication;

determining a first voice print associated with the user is stored in a user account, the first voice print to reference with the user voice command;

generating a second voice print based on the user voice command, the second voice print representing a sample of the user's voice;

authenticating the user by determining the second voice print matches the first voice print associated with the user;

storing authentication evidence associated with the determination that the second voice print matches the first voice print with the task;

obtaining the proof of user authentication based on the authentication evidence; and providing the proof of user authentication to the remote service to initiate the task with the remote service.

2. The computer-implemented method of claim 1, further comprising:

determining that a trust relationship exists with the remote service, wherein the proof of user authentication comprises a task-specific authentication token stored with the authentication evidence.

3. The computer-implemented method of claim 1, further comprising:

determining that a trust relationship does not exist with the remote service;

authenticating with an external identity provider service; and receiving from the external identity provider service the proof of user authentication.

4. The computer-implemented method of claim 1, wherein the proof of user authentication comprises a username and user password.

5. The computer-implemented method of claim 1, wherein the authentication evidence comprises one or more of:

a task-specific authentication token;

a time-stamp associated with the audio data; or an IP address associated with the user.

6. A computer-implemented method, comprising:

receiving audio data comprising a user voice command from a user;

determining a task to be completed by a remote service based on the user voice command;

determining a communication channel to complete the task with the remote service;

registering a communication session associated with the task and the communication channel;

determining the task requires proof of user authentication;

generating a sample voice print based on the user voice command, the sample voice print representing a sample of the user's voice;

determining the sample voice print cannot authenticate the user;

authenticating the user based on a non-voice authentication method;
storing authentication evidence associated with the task;
storing the audio data as a user authentication model training sample; and
training a user authentication model based on the user authentication model training sample.

7. The computer-implemented method of claim 6, further comprising:
storing authentication evidence associated with the task;
obtaining the proof of user authentication based on the authentication evidence; and
providing the proof of user authentication to the remote service in order to initiate the task with the remote service.

8. The computer-implemented method of claim 6, further comprising storing the trained user authentication model in a user account.

9. The computer-implemented method of claim 6, wherein determining that the sample voice print based on the user voice command cannot authenticate the user comprises determining that no reference voice print associated with the user is stored in a user account.

10. The computer-implemented method of claim 6, wherein determining that the sample voice print based on the user voice command cannot authenticate the user comprises determining that a reference voice print associated with the user stored in a user account does not match the sample voice print.

11. The computer-implemented method of claim 7, further comprising:
determining that a trust relationship exists with the remote service,
wherein the proof of user authentication comprises a task-specific authentication token stored with the authentication evidence.

12. The computer-implemented method of claim 7, further comprising:
determining that a trust relationship does not exist with the remote service;
authenticating with an external identity provider service; and
receiving from the external identity provider service the proof of user authentication.

13. The computer-implemented method of claim 7, wherein the proof of user authentication comprises a username and user password.

14. The computer-implemented method of claim 6, wherein the authentication evidence comprises one or more of:
a task-specific authentication token;
a time-stamp associated with the audio data; or
an IP address associated with the user.

15. An apparatus, comprising:
a memory comprising computer-executable instructions;
a processor configured to execute the computer-executable instructions and cause the apparatus to:
receive audio data comprising a user voice command from a user,
determine a task to be completed by a remote service based on the user voice command;
determine a communication channel to complete the task with the remote service;
register a communication session associated with the task and the communication channel;
determine the task requires proof of user authentication;
determine a first voice print associated with the user is stored in a user account, the first voice print to reference with the user voice command;
generate a second voice print based on the user voice command, the second voice print representing a sample of the user's voice;
authenticate the user by determining the second voice print matches the first voice print associated with the user;
store authentication evidence associated with the determination that the second voice print matches the first voice print with the task;
obtaining the proof of user authentication based on the authentication evidence; and
provide proof of user authentication to the remote service to initiate the task with the remote service.

16. The computer-implemented method of claim 6, further comprising:
generating a reference voice print based on the audio data as the user authentication training sample;
receiving subsequent audio data comprising a subsequent user voice command;
determining a subsequent task to be completed by a third-party service based on the subsequent user voice command;
determining the subsequent task requires proof of subsequent user authentication;
obtaining the reference voice print associated with the user from the user authentication model;
generating a subsequent sample voice print based on the subsequent user voice command;
authenticating the user by determining, with the user authentication model, the subsequent sample voice print matches the reference voice print associated with the user;
storing authentication evidence associated with the determination the subsequent sample voice print matches the reference voice print with the task; and
providing the proof of subsequent user authentication to the third-party service to initiate the subsequent task with the third-party service.

17. The computer-implemented method of claim 1, further comprising:
receive a communication session authentication query from the remote service; and
determining the communication session associated with the task and the communication channel is registered, wherein the proof of user authentication is provided in response to the communication session authentication query.

18. The computer-implemented method of claim 1, wherein the proof of user authentication comprises an indication that a virtual assistant is authorized to perform the task on behalf of the user.

19. The computer-implemented method of claim 1, wherein the authentication evidence comprises an indication that the user is authenticated to perform the task.

* * * * *